United States Patent [19]

Mullen

[11] Patent Number: 5,684,697
[45] Date of Patent: Nov. 4, 1997

[54] DRIVER EMULATIVE VEHICLE CONTROL SYSTEM

[76] Inventor: Charles H. Mullen, 2416 Delaney Dr., Burlington, N.C. 27215

[21] Appl. No.: 494,972

[22] Filed: Jun. 26, 1995

[51] Int. Cl.⁶ ............................................. G05D 1/00
[52] U.S. Cl. ............................................. 364/424.033
[58] Field of Search ............ 364/426.01, 424.027, 364/424.033, 426.016, 426.041, 426.044

[56] References Cited

U.S. PATENT DOCUMENTS

| | | | |
|---|---|---|---|
| 3,708,668 | 1/1973 | Tilley | 250/202 |
| 4,013,884 | 3/1977 | Dvali et al. | 250/202 |
| 4,247,896 | 1/1981 | Schmaibel | 364/436 |
| 4,459,667 | 7/1984 | Takeuchi | 364/424 |
| 4,500,970 | 2/1985 | Daemmer | 364/513 |
| 4,621,705 | 11/1986 | Etoh | 180/169 |
| 4,626,995 | 12/1986 | Lofgren et al. | 364/424 |
| 4,644,146 | 2/1987 | Wurster | 250/202 |
| 4,757,450 | 7/1988 | Etoh | 364/426 |
| 4,802,096 | 1/1989 | Hainsworth et al. | 364/461 |
| 4,905,151 | 2/1990 | Weiman et al. | 364/424 |
| 4,970,509 | 11/1990 | Kissinger, Sr. | 340/901 |
| 5,111,401 | 5/1992 | Everett, Jr. et al. | 364/424.02 |
| 5,115,398 | 5/1992 | De Jong | 364/443 |
| 5,155,683 | 10/1992 | Rahim | 364/424 |
| 5,159,557 | 10/1992 | Ogawa | 364/460 |
| 5,163,002 | 11/1992 | Kurami | 364/424 |

(List continued on next page.)

OTHER PUBLICATIONS

Jochem et al., "Massively Parallel, Adaptive, Color Image Processing for Autonomous Road Following", Massively Parallel Artificial Intelligence, pp. 281–315, 1994.

Dickmanns et al., "A Curvature-based Scheme for Improving Road Vehicle Guidance by Computer Vision," Proceedings of the Advances in Intel. Robotic Systems, 1986, pp. 1–8.

Nashman et al., "Real-time Visual Processing for Autonomous Driving" Proceedings of Intel. Vehicle Symposium, 1993, pp. 373–378.

Thorpe, "Outdoor Visual Navigation of Autonomous Robots", Proceedings of Intelligent Autonomous Systems, 1989.

Zhang et al., "Texture Analysis and Model-Based Road Recognition for Autonomous Driving", Aug. 18, 1994, pp. 1–19.

*Primary Examiner*—Kevin J. Teska
*Assistant Examiner*—Stephen J. Walder, Jr.
*Attorney, Agent, or Firm*—Rhodes, Coats & Bennett, L.L.P.

[57] ABSTRACT

A driver emulative vehicle control system for use with a vehicle. The vehicle control system includes a video camera which transduces the field of view into a plurality of scan lines each comprising a plurality of pixels. A digitizer serves to digitize the frames from the video camera. A computer inputs the digitized frames and processes the same to control the steering, acceleration, deceleration, and braking of the vehicle. More particularly, the processing means includes addressing means, steering control processing means, and speed control processing means. The addressing means serves to map the digitized frames into a mapping memory which is read by the steering control processing means and the speed control processing means. With reference to a lane stripe or stripes in the field of view, the steering control processing means determines the location of the vehicle and generates a steering control signal corresponding thereto. A steering control means receives the steering control signals and controls the steering shaft of the vehicle in accordance therewith. The speed control processing means determines the presence and location of a leading vehicle in the lane and generates speed control signals corresponding thereto. A speed control means serves to receive the speed control signals and to control the throttle control and/or brake of the vehicle.

Methods for automatically controlling the steering as well as the acceleration, deceleration and braking of a vehicle are also disclosed.

29 Claims, 7 Drawing Sheets

U.S. PATENT DOCUMENTS

| | | | |
|---|---|---|---|
| 5,166,878 | 11/1992 | Poelstra | 364/424 |
| 5,172,315 | 12/1992 | Asanuma et al. | 364/424 |
| 5,195,144 | 3/1993 | Le Parquier et al. | 382/1 |
| 5,220,508 | 6/1993 | Ninomiya et al. | 364/449 |
| 5,229,941 | 7/1993 | Hattori | 364/424 |
| 5,230,400 | 7/1993 | Kakinami et al. | 180/169 |
| 5,233,527 | 8/1993 | Shinnosuke | 364/424 |
| 5,243,524 | 9/1993 | Ishida et al. | 364/424 |
| 5,243,663 | 9/1993 | Kudoh | 382/1 |
| 5,245,422 | 9/1993 | Borcherts et al. | 358/103 |
| 5,247,439 | 9/1993 | Gurmu et al. | 364/424 |
| 5,297,049 | 3/1994 | Grumu et al. | 364/436 |
| 5,299,130 | 3/1994 | Ono | 364/424 |
| 5,299,300 | 3/1994 | Femal et al. | 395/128 |
| 5,301,115 | 4/1994 | Nouso | 364/460 |
| 5,359,666 | 10/1994 | Nakayama et al. | 382/1 |
| 5,366,376 | 11/1994 | Copperman et al. | 434/69 |
| 5,390,118 | 2/1995 | Margolis et al. | 364/424.02 |
| 5,410,346 | 4/1995 | Saneyoshi et al. | 348/116 |
| 5,483,453 | 1/1996 | Uemura et al. | 364/424.02 |
| 5,517,412 | 5/1996 | Unoura | 364/424.02 |
| 5,529,139 | 6/1996 | Kurahashi et al. | 180/169 |
| 5,555,312 | 9/1996 | Shima et al. | 382/104 |

DRIVER EMULATIVE VEHICLE CONTROL SYSTEM

FIELD OF THE INVENTION

The present invention is directed to control systems for automatically controlling vehicles, and, more particularly, to a vehicle control system which controls the acceleration, braking, and steering of a vehicle in accordance with preselected parameters and, further, which implements said controls in a manner emulative of a real driver.

BACKGROUND OF THE INVENTION

A large proportion of vehicle and other vehicle use is on highways and the like where travel is made at a relatively constant speed for long periods of time. In highway traveling, generally only incremental input is required of the driver. For so long as the driver wishes to remain in one lane and no other vehicles in the vicinity assume speeds significantly different from that of the driver's vehicle, the driver need only make small adjustments to the throttle and the steering wheel to maintain the vehicle within the boundaries of the chosen lane and within the desired range of speeds.

Many vehicles today are equipped with cruise control modules which address the need to make incremental adjustments to the throttle to account for changes in the topography and thereby maintain the speed of the vehicle within the desired range. However, cruise control modules do not serve to maintain the vehicle within the chosen lane, nor do they address the problem of other vehicles in the path of the vehicle traveling at a lower speed. Without driver input, the vehicle will leave the lane and/or collide with a slower vehicle.

In order to remain within acceptable safety standards, the driver must become involved with control of the vehicle at some point. That is, a control system should not assume all control of the vehicle as certain conditions may arise where the driver's judgment is required to avoid an accident. Therefore, the driver must be able to override the control system. It is desirable to maximize the ease, confidence, and accuracy of such override actions by the driver.

Further, it is desirable that a control system as described above be easily adaptable for mounting on various models of vehicles. Such a control system should be cost-effective to design and manufacture as well as to install.

Various control systems have been developed to control acceleration, braking, or steering of a vehicle. To applicant's knowledge, no single control system has been developed which controls acceleration, braking, and steering of a vehicle. Moreover, the control systems of the known prior art are generally relatively complex and do not lend themselves to cost-effective design, manufacture and installation for and on a variety of vehicles. Namely, they involve complex and extensive means and methods for evaluating the environment, determining the action to be taken, and executing the chosen action. As such, widespread implementation on consumer vehicles is typically unfeasible.

Thus, there exists a need for a vehicle control system which controls acceleration, braking, and steering of the vehicle. The vehicle control system should consist of readily available components or only simply modified versions thereof and should implement relatively simple algorithms so that the vehicle control system may be cost-effectively designed and manufactured for various models of vehicles. The vehicle control system should be driver-friendly and, preferably, should emulate the interaction of the driver with the vehicle. That is, the vehicle control system should be mechanized in such manner that it controls the operation of the vehicle by interacting with the same or similar input means as the driver would and in much the same manner. The system should implement relatively simple and straightforward means and methods for evaluating the environment, determining the action to be taken, and executing the chosen action.

SUMMARY OF THE INVENTION

The present invention is directed to a driver emulative vehicle control system for use with a vehicle of the type having a steering shaft, a throttle control, a brake, and a turn signal. The vehicle control system includes a video camera which transduces light variations in a prescribed field in front of the vehicle into frames of electrical variations. Each of the frames comprise a plurality of scan lines which in turn comprise a plurality of pixels. A digitizer digitizes the frames of electrical variations. A computer having processing means inputs the digitized frames. The processing means includes addressing means, steering control processing means, and speed control processing means. The addressing means create an image in the mapping memory such that each pixel of each frame is addressed by a scan line number and a pixel number. The steering control processing means reads the mapping memory, determines for each frame the location of a lane stripe or stripes with respect to the vehicle, and generates a steering control signal corresponding to the determined locations. Steering control means receive the steering signal and control the steering shaft of the vehicle in accordance therewith. The speed control processing means reads the mapping memory, determines for each frame the presence and location with respect to the vehicle of a leading vehicle, and generates speed control signals corresponding to the determined locations of the leading vehicle. Speed control means receive the speed control signals and control the throttle control and/or the brake of the vehicle.

Preferably, the steering control means include a motor operative in response to the steering control signals to turn the steering shaft of the vehicle. More preferably, the steering control means further include an electromagnetic clutch fixedly mounted on the steering shaft, a driven gear rotatably mounted on the steering shaft, and a mating drive gear mounted for rotation by the motor and intermeshed with the driven gear, the electromagnetic clutch being selectively energizeable and de-energizeable to engage and disengage, respectively, the driven gear.

Preferably, the speed control means includes brake control means. The brake control means may include a servo actuator interconnected with a brake pedal for controlling the position of the brake pedal.

The speed control means may further include means for controlling the throttle control of the vehicle.

Preferably, the steering control processing means is operative to monitor the lane stripe continuously even if the lane stripe includes gaps.

The speed control processing means is preferably operative to determine the following distance to a leading vehicle, and further to determine a closing rate between the vehicle and the leading vehicle.

Preferably, the speed control processing mean is operative to control the acceleration, deceleration, and braking of the vehicle in accordance with prescribed relationships between the vehicle speed, following distance to a leading vehicle, and closing rate between the equipped vehicle and a leading vehicle.

It is an object of the present invention to provide a driver emulative vehicle control system for use with a vehicle.

It is an object of the present invention to provide a vehicle control system which may be assembled from readily available components or simply modified versions thereof.

A further object of the present invention is to provide such a vehicle control system which implements relatively simple algorithms so that the vehicle control system may be cost effectively designed and manufactured for various models of vehicles.

Also, it is an object of the present invention to provide a vehicle control system which is driver friendly.

Yet another object of the present invention is to provide a vehicle control system which uses relatively simple and straightforward means and methods for evaluating the environment, determining the action to be taken, and executing the chosen action.

BRIEF DESCRIPTION OF THE DRAWINGS

Other objects and a fuller understanding of the invention will become apparent upon reading the following detailed description of a preferred embodiment, along with the accompanying drawings in which.

DETAILED DESCRIPTION OF THE PREFERRED EMBODIMENT

Figure 1:
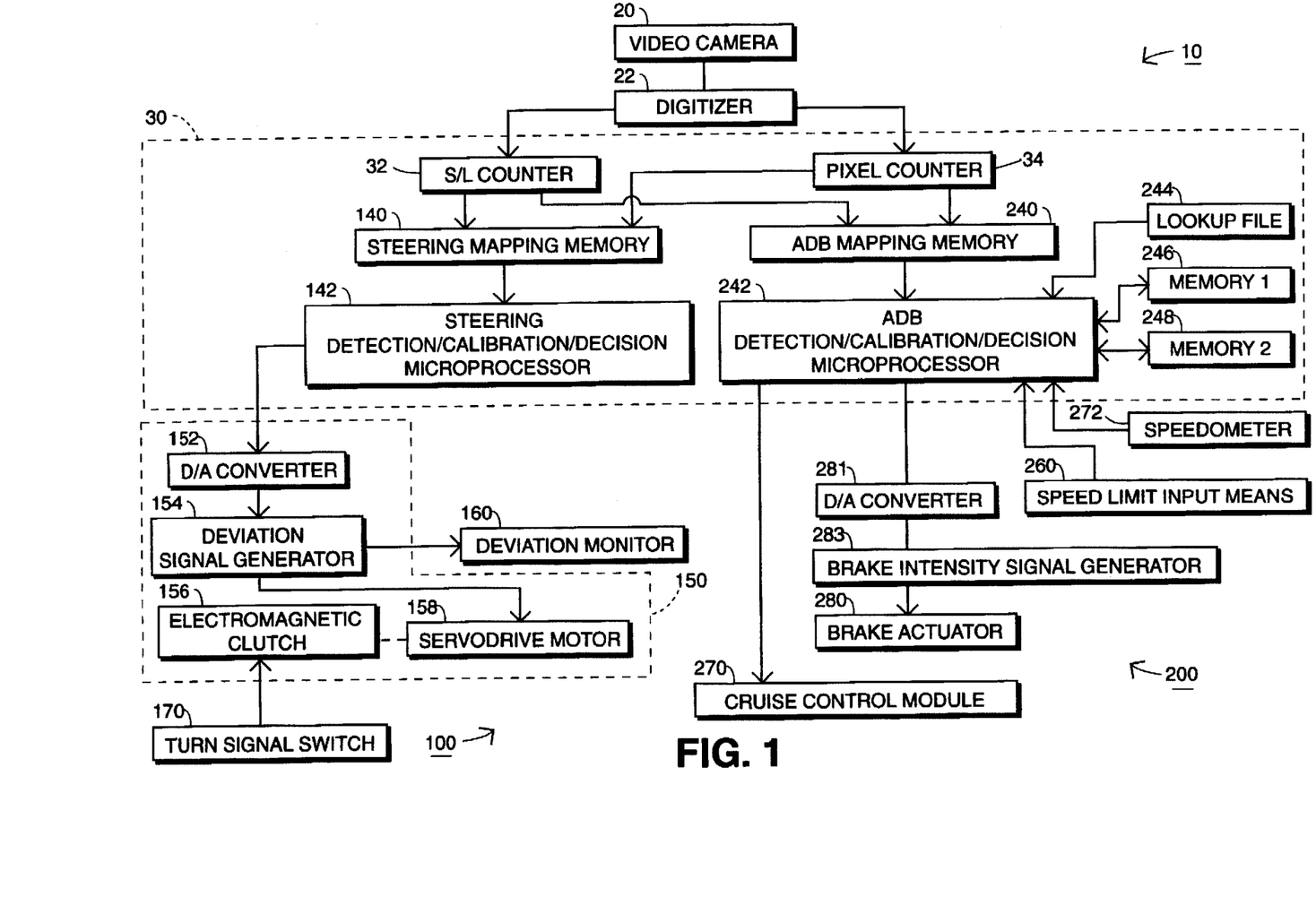
FIG. 1 is a block diagram showing a vehicle control system according to the present invention as well as components of the vehicle which provide input to and receive input from the vehicle control system.

With reference to FIG. 1, a driver emulative vehicle control system according to the present invention, generally denoted by the numeral 10, is shown therein. Vehicle control system 10 comprises, generally, steering control subsystem 100 and accelerating/decelerating/braking subsystem 200 (hereinafter ADB subsystem 200). In the preferred embodiment as shown in FIG. 1 and as discussed below, steering subsystem 100 and ADB subsystem 200 each include a common computer 30 which receives digitized input from video camera 20. As discussed in more detail below, steering subsystem 100 serves to control the steering mechanism of the vehicle and thereby maintain the vehicle 12 within the boundaries of a chosen lane. ADB subsystem 200 serves to control the speed of the vehicle by controlling the cruise control module, and thereby the throttle, of the vehicle and the brake mechanism of the vehicle.

Video camera 20 is preferably mounted on the roof of the vehicle directly above the rear view mirror. Video camera 20 transduces light variations in the chosen field in front of the vehicle 12 into electrical variations which, in turn, are digitized by digitizer 22. Video camera 20 is preferably a monochrome high sensitivity type such as, for example, an image orthocon or videcon capable of operating at low light levels to accommodate night-time driving. Standard scanning features such as those in most television cameras are adequate. A suitable video camera includes the N700 Pan Cam Series high-resolution camera available from EMCO of Flanders, N.J.

Preferably, video camera 20 frames the chosen lane on the order of 30 times per second. Further, video camera 20 preferably creates 420 picture elements (pixels) on each of 525 scan lines per frame. Digitizer 22 may be, for example, a Computer Eyes/RT Monochrome available from Digital Vision, Inc. of Dedham, Mass.

Each of steering mapping memory 140 and ADB mapping memory 240 are addressable. The digitized scan lines (S/L) and pixels on each scan line are addressed by scan line counter 32 and pixel counter 34, respectively, and thereby mapped into each of steering mapping memory 140 and ADB mapping memory 240. In this manner, video camera 20, digitizer 22, scan line counter 32, and pixel counter 34 produce records in each of steering mapping memory 140 and ADB mapping memory 240 which accurately reflect the video camera's field of view. Thus, the visual map as seen by video camera 20 becomes a magnetic map in memories 140, 240. Scan line counter 32 and pixel counter 34 are preferably software routines which may be run by microprocessor 142, microprocessor 242, or a third microprocessor.

Figure 3:
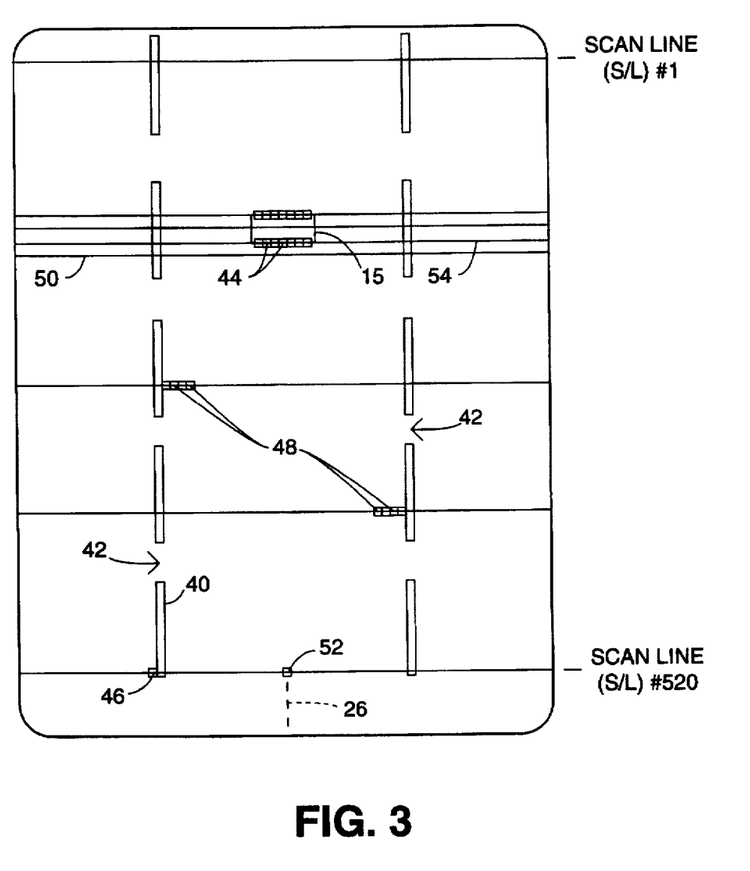
FIG. 3 is a schematic view representing the digitized input of the video camera forming a part of the vehicle control system.

With reference to FIG. 3, an exemplary frame as transduced by video camera 20, digitized by digitizer 22, and mapped into memories 140, 240 is shown therein.

Computer 30 includes steering detection/calculation/decision microprocessor 142 (hereinafter steering microprocessor 142) and ADB detection/calculation/decision microprocessor 242 (hereinafter ADB microprocessor 242), which may be separate microprocessors or a single microprocessor serving both functions (as well as the addressing function discussed above). For the sake of clarity, the microprocessor or microprocessors will be described as separate components. The microprocessor or each of the microprocessors may be, for example, an INTEL™ PENTIUM™ chip. As discussed in more detail below, computer 30 serves to detect differences in pixel levels brought about by the presence of a leading vehicle, a passing vehicle entering the controlled vehicle's lane, and the left side lane stripe of the lane. Computer 30 also serves to receive and input other relevant data and output decision signals to steering control means 150, cruise control module 270, and brake actuator 280.

Computer 30 "detects" or "senses" objects (e.g., lane stripes, vehicles) in the field of view by first determining the ambient light level in the vicinity of the object and then determining whether the luminescence of a given pixel exceeds the ambient light level by a prescribed factor (e.g., 1.5), in which case the pixel is identified as a "sensing pixel".

Steering microprocessor 142 detects and identifies the number of the pixel 46 on scan line #520 (S/L #520) which first senses the left side lane stripe 40. Scan line number 525 is positioned on the road approximately nine feet in front of the vehicle's bumper with a lower look angle of approximately 15°. The upper look angle determined by scan line #1 is only 1.4° below horizontal. Scan line #520 is chosen for detecting the lane stripe because the camera is tilted downward such that scan line #525 (S/L #525) has a line of sight to the ground which just clears the hood of the vehicle. Backing off five scan lines helps insure clear vision for steering computations. The identification of pixel 46 is used to calculate the distance D between the left side lane stripe 40 and the center pixel 52. Distance D, the distance from the left side lane stripe to the center pixel is calculated as the quotient of the viewing width divided by the number of pixels times the difference between the number of the center pixel and the number of the left side lane stripe first sensing pixel.

For example, suppose the camera viewing width is sixteen feet, allowing a comfortable two feet of overlap on each of the left and right lane stripes of a typical twelve foot wide lane when the vehicle is centered. With 420 pixels per scan line, this gives a spacing of slightly less than a half inch between respective pixels. If first sensing pixel 46 is the 52nd pixel, center pixel 52 is calculated to be six feet from left side lane stripe 40 and microprocessor 142 determines that the vehicle is centered in the lane. If, however, first sensing pixel 46 has a lower or higher pixel number, microprocessor 142 determines that the vehicle is to the right or left, respectively, of imaginary center line 26 of the lane.

Figure 4:
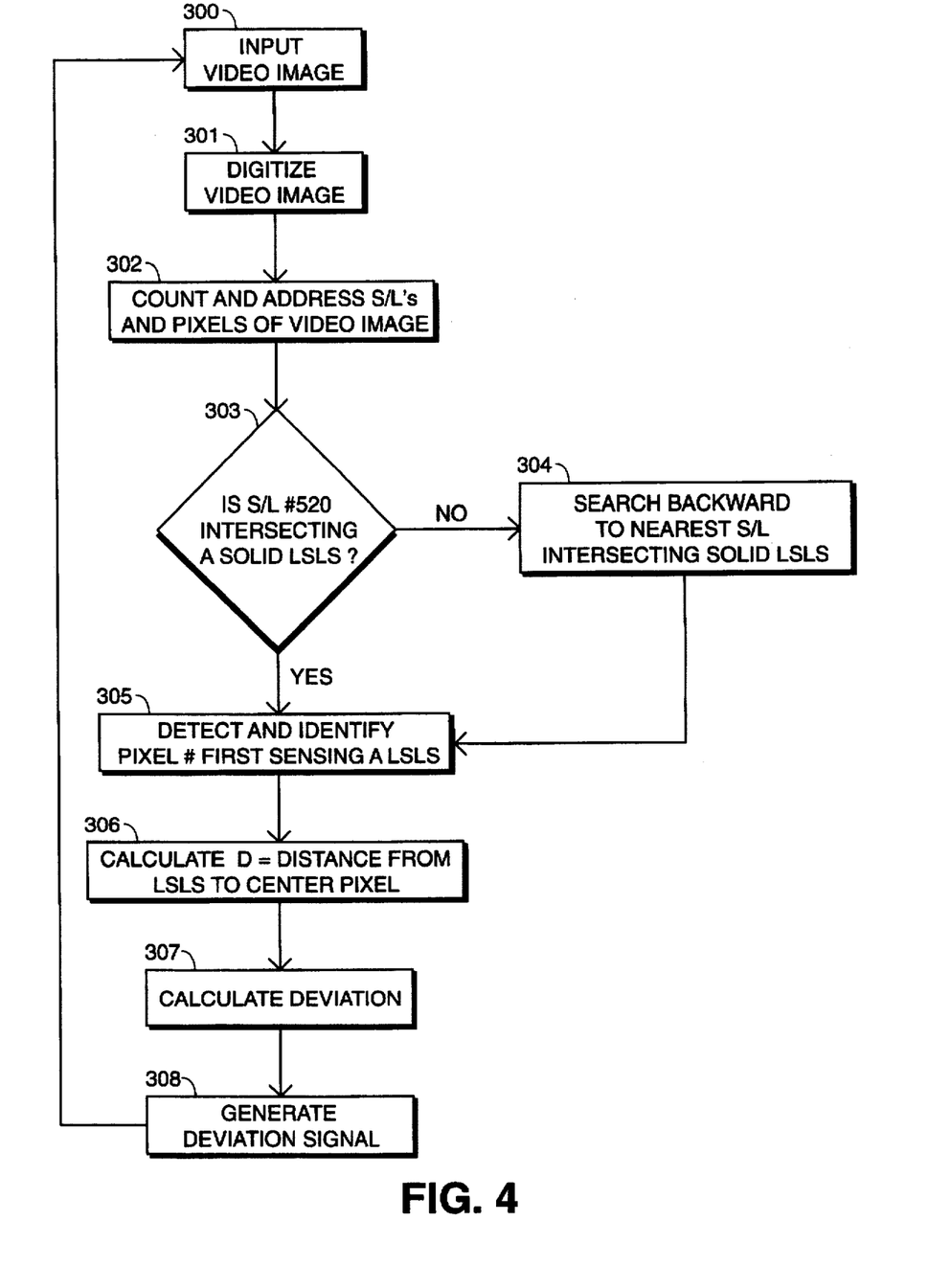
FIG. 4 is a block diagram representing the operation of the steering control subsystem.

Left side lane stripe 40 is critical to the steering control function. Left side lane stripe 40 is not a solid line in most cases. Hence, computer enhancement is required to make the left side lane stripe appear solid to microprocessor 142 of steering control subsystem 100. This is accomplished by implementing a search routine to span the gaps between consecutive left side lane stripes. If a pixel on scan line #520 (S/L #520) senses a left side lane stripe 40, then the process proceeds as above. However, if a pixel on scan line #520 does not sense a solid portion, microprocessor 142 determines that scan line #520 is intersecting an open section of the lane stripes. Microprocessor 142 then begins a gap search routine for the nearest scan line (i.e., the scan line with the highest number) which is intersecting a solid portion of a left side lane stripe 40. The gap search routine will not be adopted when scan line #520 actually intersects a solid left side lane stripe 40. With reference to FIG. 4, operation of the steering control subsystem 100 is set forth therein. The process shown is reiterated for each frame of video camera 20.

In steps 300 and 301, the video image from video camera 20 is digitized by digitizer 22. In step 302, the digitized image is counted and addressed by counters 32, 34 and mapped into steering mapping memory 140.

In step 303, microprocessor 142 references memory 140 and determines whether scan line #520 is intersecting a solid left side lane stripe 40 (i.e., there exists a contrasting pixel 46 on scan line #520).

If the answer to the query of step 303 is "no", then scan line #520 is intersecting a gap in the left side lane stripe. Microprocessor 142 enters the gap search routine of step 304. In step 304, microprocessor 142 searches backward numerically (forward directionally) to determine the nearest scan line which intersects a solid left side lane stripe. The first sensing pixel on this nearest scan line is then adopted as the first sensing pixel for the remaining determinations of the present iteration of the process.

In step 305, the first sensing pixel is detected and identified as such for the calculation of step 306. In step 306, D is calculated as the distance between the left side lane stripe (corresponding to the identified first sensing pixel) and center pixel 52.

Thereafter, in step 307, microprocessor 142 calculates the Deviation between center pixel 52 and imaginary center line 26 by subtracting the center line offset (i.e., the theoretical distance between the center line and the left side lane stripe) from the measured distance D.

Steering control subsystem 100 may be further configured such that if the left side lane stripe cannot be detected, it will sense the right side lane stripe instead. This may be necessary if a passing vehicle enters from the left, thereby blocking the video camera's view of the left side lane stripe at those scan lines where the lane positioning determination is made. Moreover, subsystem 100 may monitor pixels just outside of the left side lane stripe to determine whether a passing vehicle is encroaching on the left side lane stripe, indicating that the vehicle is about to enter the vehicle lane and block steering vision of the left side lane stripe. If so, subsystem 100 will switch over to monitor the right side lane stripe for steering control purposes. Preferably, only one determination/calculation will be made using the right side lane stripe before returning to the left side lane stripe to re-evaluate the presence of an encroaching vehicle.

With reference to FIGS. 1 and 4, in step 308, microprocessor 142 generates a digital deviation signal which is processed through digital to analog converter (D/A converter) 152 available from Lutze Inc. of Charlotte, N. C., and amplified by deviation signal generator 154, for example, a DC-to-DC amplifier from GTK Corp. of El Segundo, Calif. The amplified deviation signal is transmitted to servo drive motor 158 and deviation monitor 160.

Figures 6, 7:
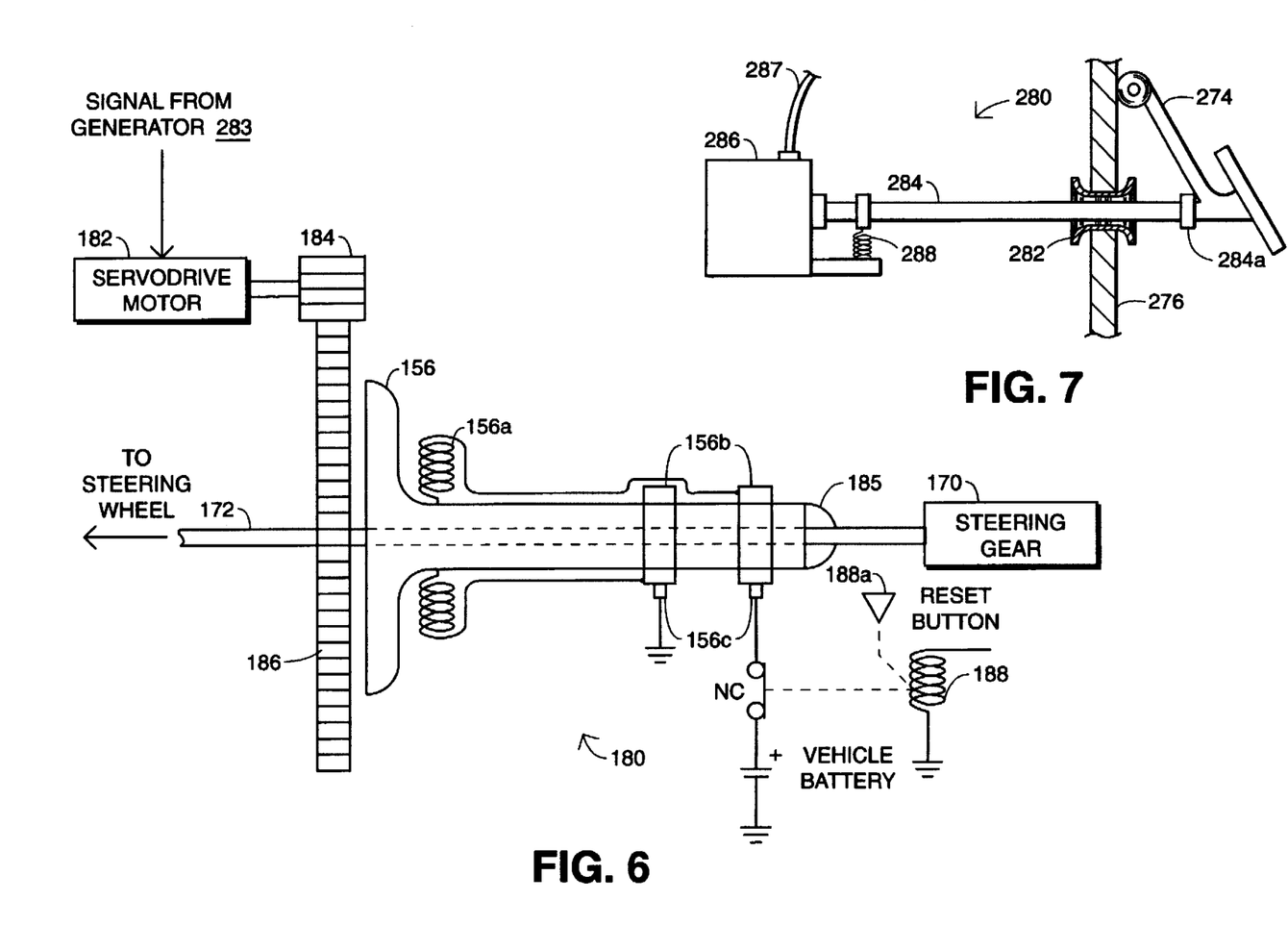
FIG. 6 is a schematic, side elevational view of a steering mechanism forming a part of the vehicle control system.
FIG. 7 is a side view of a braking mechanism forming a part of the vehicle control system as mounted on a vehicle, portions of the vehicle being shown in cross-section.

With reference to FIG. 6, steering mechanism 180 is shown therein. Servo drive motor 182 is preferably a DC motor with a fixed field excitation. Pinion gear 184 is mounted on the shaft of motor 182. Gear 184 mates with a free floating gear 186 mounted on the input shaft 172 of the vehicle's steering gear 170. When the reset button 188a is pressed, the normally closed (NC) contact of latching relay 188 is closed, energizing electromagnetic clutch 156. Electromagnetic clutch 156 includes energizing winding 156a, slip rings 156b, and brushes 156c. Clutch 156 is secured to steering shaft 172 by fillet weld 185. When electromagnetic clutch 156 is energized, the electromagnetic force causes gear 186 to slide along shaft 172 until the mating surfaces of gear 186 and clutch 156 contact each other, whereupon gear 186 is captured or fasted to the clutch. The deviation signal from deviation signal generator 154 activates motor 182, thereby turning gear 186 which in turn drives input shaft 172 via clutch 156. When the turn signal is activated, normally closed (NC) contacts on latching relay 188 open the servo drive motor circuit as well as the electromagnetic clutch circuit. Relay 188 must be manually reset when steering control subsystem 100 is again ready for activation. Deviation monitor 160 guides the driver in reducing the deviation to near zero before reactivating.

A suitable servo drive motor includes Model No. 32.09L, available from Bison Electric Corp. of Elgin, Ill. Suitable electromagnetic clutches are available from DYNACORP of Rockford, Ill. The deviation monitor may be, by way of example, a Micronta center-zero voltmeter, available from Tandy Corp. of Ft. Worth, Tex.

By way of example, microprocessor 142 will calculate D=six feet and Deviation=zero (six feet minus six feet) when center pixel 52 is exactly in the center of a typical twelve foot wide lane. If the vehicle drifts right and the computer calculates D=seven feet, a Deviation of one foot will be calculated and a corresponding deviation signal sent to the servo drive motor to steer the vehicle left. Conversely, if the vehicle drifts left and the computer calculates D=five feet, a Deviation of negative one foot will cause the servo drive motor to steer the vehicle right. Interstate highway speeds equate to roughly one hundred feet per second. Thus, steering control subsystem 100 will furnish a corrective steering signal for about each three feet of travel (i.e., 30 times per second).

Figure 2:
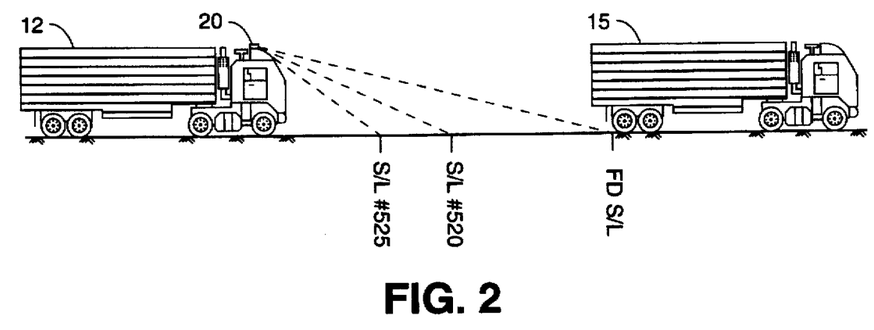
FIG. 2 is a schematic diagram representing the relationship between a vehicle equipped with the vehicle control system of FIG. 1 and a leading vehicle.

ADB subsystem 200 accelerates, decelerates, and brakes the equipped vehicle 12 to maintain a safe following distance FD from the vehicle immediately in front of the equipped vehicle 12 (hereinafter referred to as leading vehicle 15). The safe FD is ultimately determined by calculating and examining the closing rate CR between vehicle 12 and vehicle 15 for each successive camera frame. The safe FD and CR are both functions of the speed of vehicle 12.

With reference to FIG. 1, and as noted above, ADB subsystem 200 shares video camera 20, digitizer 22, scan line counter 32, and pixel counter 34 with steering control subsystem 100. ADB subsystem 200 is provided with ADB mapping memory 240 in which the addressed, digitized images are stored for each frame. ADB detection/calculation/decision microprocessor 242 (hereinafter ADB microprocessor 242) utilizes input from ADB mapping memory 240, vehicle speedometer 272, and speed limit input means 260, as well as look up file 244, to determine the actual following distance $FD_2$ and calculate the instantaneous closing rate CR. Based on these determinations and calculations, ADB microprocessor 242 determines the appropriate action to be taken with respect to control of the vehicle and accordingly generates control signals to the vehicle's standard cruise control module 270 and/or brake actuator 280. Signals to brake actuator 280 are first processed by D/A converter 281 and brake intensity signal generator 283.

Acceleration and deceleration of the vehicle's engine is accomplished by generating incremental acceleration and deceleration control signals from ADB microprocessor 242 to the vehicle's standard cruise control module 270 which reset the module's speed reference points. Braking of the vehicle is accomplished through brake actuator 280 which, by means of a servo actuator, displaces the vehicle's brake pedal thereby actuating the vehicle's conventional braking system.

With reference to FIG. 3, the actual following distance $FD_2$ is determined during each consecutive camera frame by ADB microprocessor 242 by detecting and identifying the boundary between those scan lines 54 whose pixels 44 sense leading vehicle 15 and the nearest (to vehicle 15) scan line 50 having no pixels which sense the leading vehicle. The actual following distance relating to each scan line is precalculated and stored in computer look up file 244. $FD_2$ values for successive frames are used to calculate the instantaneous closing rate CR.

Figure 5:
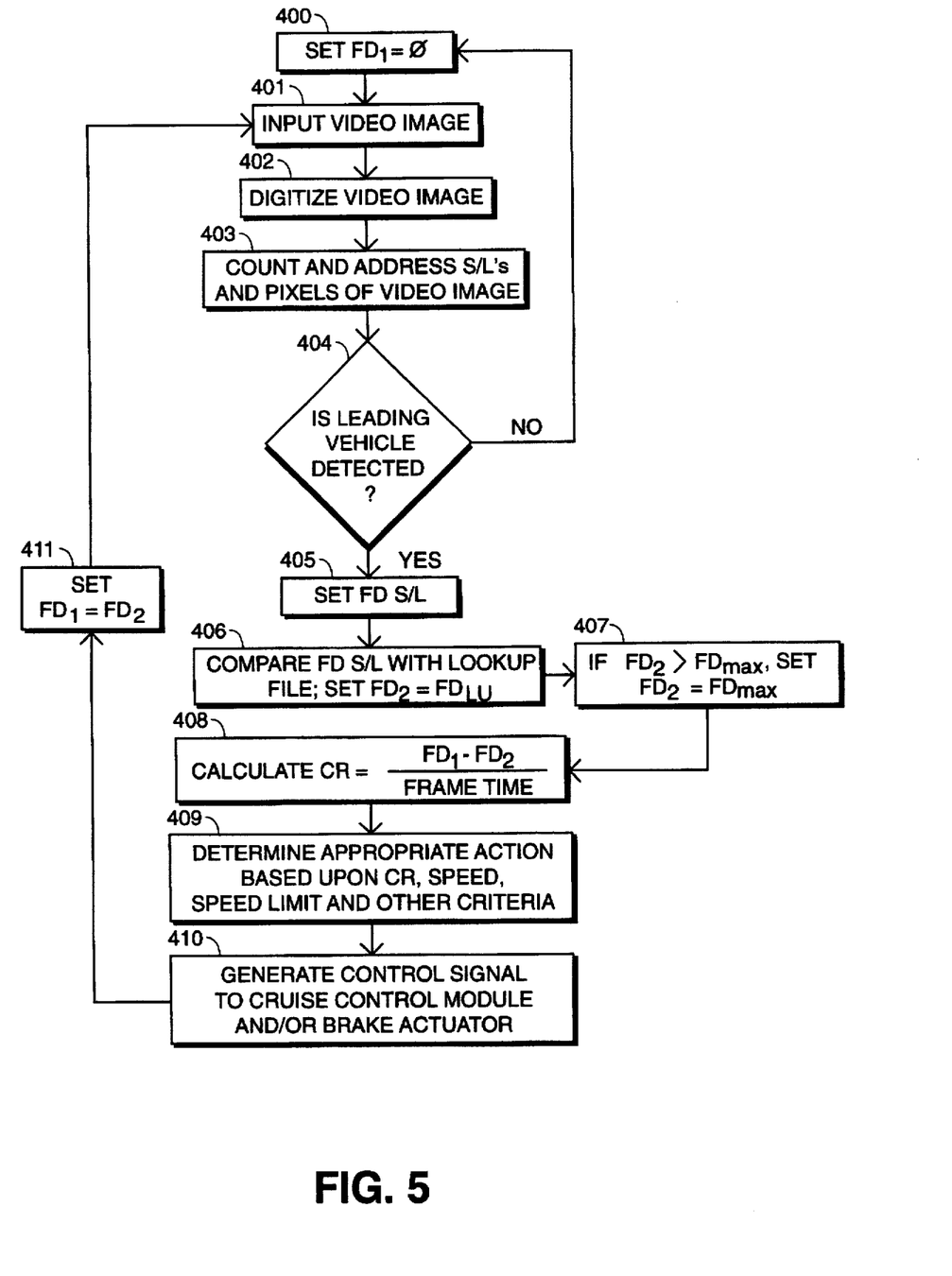
FIG. 5 is a block diagram representing the operation of the accelerating/decelerating/braking subsystem.

With reference to FIG. 5, the process of determining the actual following distance $FD_2$ and calculating the instantaneous closing rate CR is shown therein.

In step 400, $FD_1$ is initialized to zero. Step 400 is executed each time vehicle control system 10 is activated or reset, as well as when there are no vehicles in the area of concern.

In steps 401, 402, and 403, the instantaneous view of video camera 20 is framed, digitized, and addressably mapped into ADB mapping memory 240 as discussed above.

In step 404, microprocessor 242 inspects the frame stored in memory 240 to determine whether there exist pixels 44 detecting a leading vehicle 15. If no such pixels are found, this indicates that there is no leading vehicle 15 within the range of concern and the process is reinitialized by returning to step 400. If pixels 44 are detected, then microprocessor 242 identifies the intersecting scan line 54 which is nearest to the last scan line 50 which does not intersect the leading vehicle 15 (i.e., the nearest scan line detecting the leading vehicle). In this way, microprocessor 242 identifies the boundary or rear bumper of the leading vehicle and, in step 405, sets this last sensing scan line as the following distance scan line (FD S/L).

In step 406, microprocessor 242 compares the FD S/L with the values in look up file 244 to determine the precalculated following distance corresponding to the detected FD S/L. $FD_2$ is set equal to the corresponding following distance $FD_{LU}$ found in look up file 244.

In step 407, if $FD_2$ (the actual following distance as determined for the present frame) exceeds a maximum following distance value $FD_{MAX}$, then $FD_2$ is set as $FD_{MAX}$. $FD_{MAX}$ corresponds to the maximum following distance of concern. That is, if the instantaneous following distance exceeds $FD_{MAX}$, there are no vehicles in the field of camera view warranting action of any type by vehicle control system 10.

In step 408, the closing rate CR is calculated as the difference between the determined following distance of the previous frame, $FD_1$, and the determined following distance of the current frame, $FD_2$, divided by the period between frames.

In step 409, microprocessor 242 determines the appropriate action based on the calculated closing rate CR, the current speed as input from speedometer 272, the indicated speed limit as input via speed limit input means 260, and other criteria. The other criteria as well as the method of determination are discussed more fully below with respect to FIG. 5a.

In step 410, microprocessor 242 generates a control signal, in accordance with the determinations of step 409, to cruise control module 270 and/or brake actuator 280.

In step 411, the value of $FD_1$, currently stored in first memory 246 and corresponding to the following distance of the previous frame, is replaced with the value of $FD_2$, currently stored in second memory 248 and corresponding to the current determined following distance.

Figure 5A:
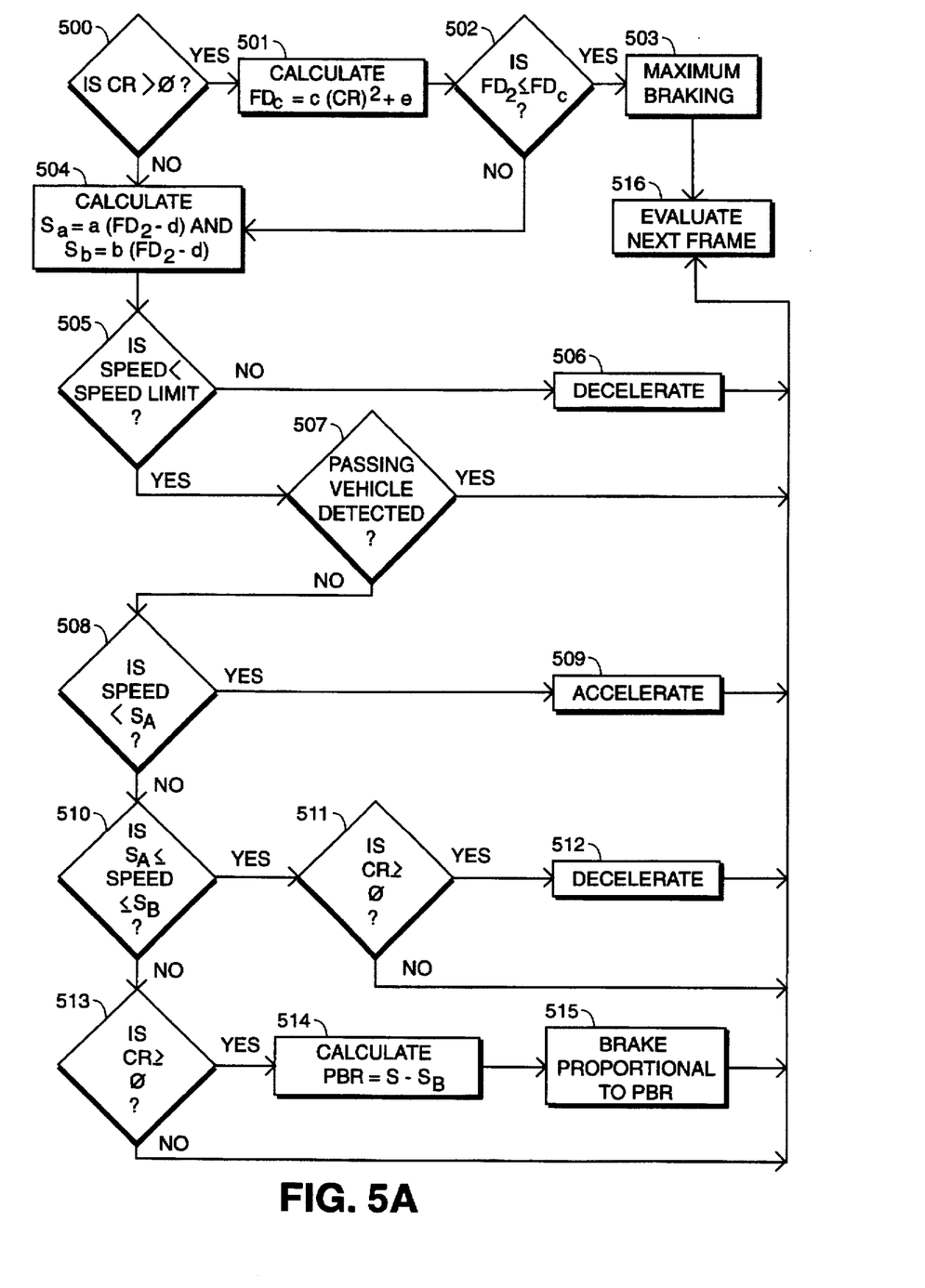
FIG. 5a is a block diagram representing the operation of the accelerating/decelerating/braking subsystem.
Figure 8:
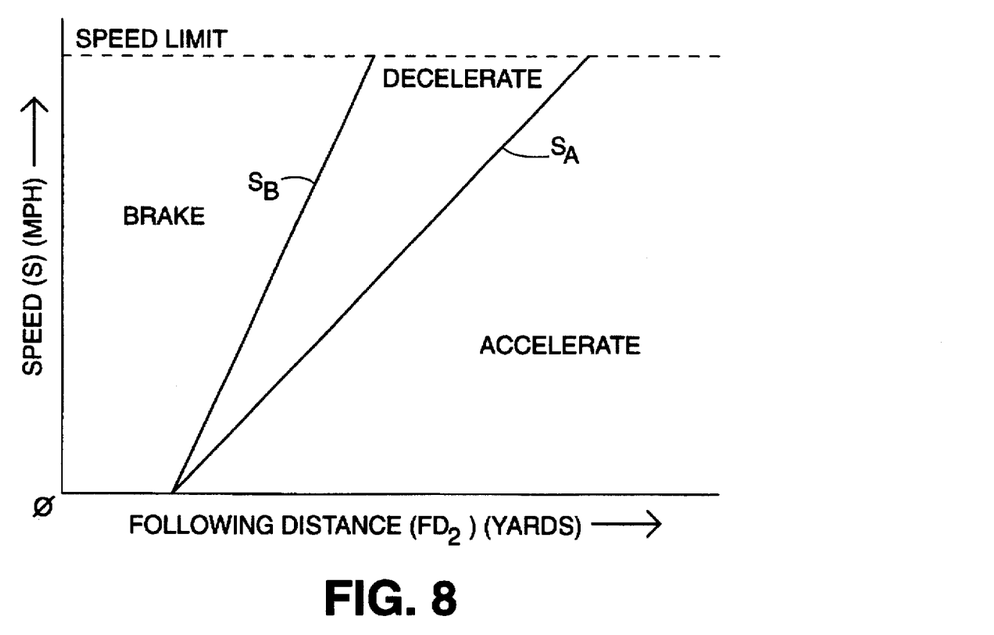
FIG. 8 is a graph representing the criteria for the control of the throttle and brake of the vehicle by the vehicle control system as a function of following distance.
Figure 9:
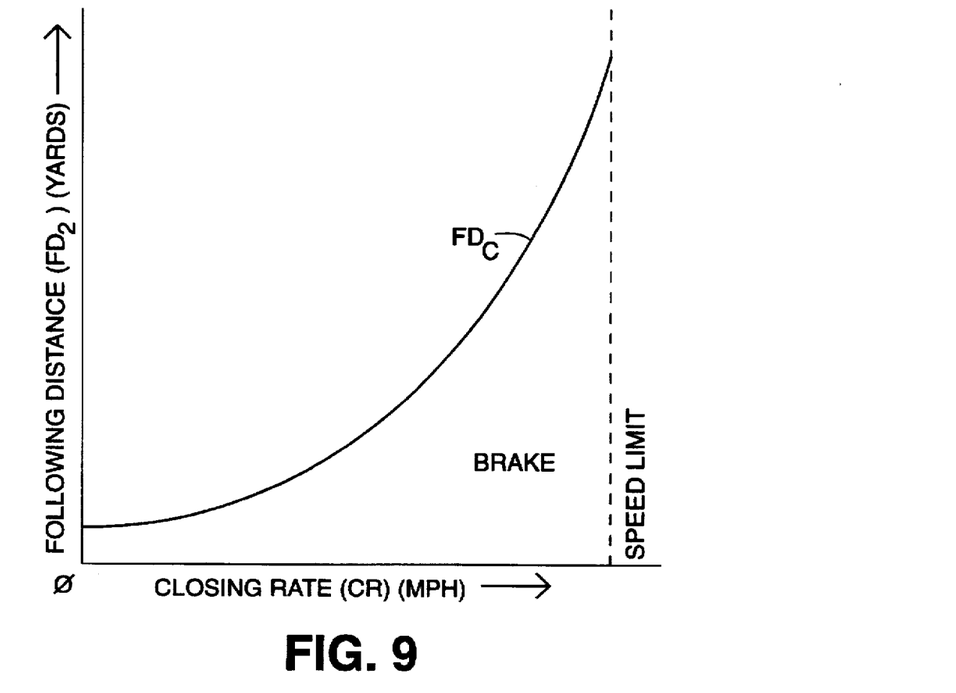
FIG. 9 is a graph representing the criteria for hard braking of the vehicle by the vehicle control system.

With reference to FIG. 5a, and FIGS. 8 and 9, the decision making process and criteria of ADB subsystem 200 are shown therein. The critical value for all action determinations is the instantaneous closing rate CR. As discussed above, the closing rate derives directly from the current and immediately previous following distances ($FD_2$ and $FD_1$, respectively). The closing rate is critical in two situations.

The first is when a passing vehicle (as indicated by pixels 48 in FIG. 3) enters the lane of the controlled vehicle thereby abruptly decreasing the instantaneous following distance $FD_2$. If the closing rate is positive, severe breaking may be necessary to avoid collision. However, if the closing rate is negative, then the desired procedure is to maintain constant vehicle speed as the passing vehicle pulls away.

The second situation in which closing rate is critically important is when a stopped or nearly stopped vehicle is in the controlled vehicle's lane.

The criteria for accelerating, decelerating, and braking as discussed below are graphically shown in FIGS. 8 and 9.

FIG. 9 graphically represents the criteria for hard braking or panic stopping. When the instantaneous following distance and closing rate are such that the situation falls within the "Brake" zone (the region below and to the right of curve $FD_C$), hard braking or panic stopping is required. Hard braking is accomplished by sending a strong braking signal from brake intensity signal generator 283 to brake actuator 280.

With reference to FIG. 8, when the relationship between the speed of the controlled vehicle and the actual following distance between the controlled vehicle and the leading vehicle are such that the situation corresponds to a point in the first region (i.e., to the left of curve $S_B$), it is predetermined that braking is required. However, in most situations, proportional intensity braking is desired. It is not desirable to have extreme or hard braking every time some amount of braking is needed. Thus, for a given following distance, if the actual speed S is greater than a designated braking speed $S_B$, some amount of braking will be required. Proportional braking is likewise implemented through brake actuator 280 with the strength of the signal from generator 283 corresponding to the calculated proportional braking rate (PBR).

With further reference to FIG. 8, when the relationship between the speed of the controlled vehicle and the following distance between the controlled vehicle and the leading vehicle are such that the situation falls within the "Decelerate" region (defined by the braking speed curve $S_B$ and the acceleration speed curve $S_A$), then microprocessor 242 generates a signal to cruise control module 270 automatically resetting 270 automatically resetting the speed reference point to The new, lower value corresponds to the degree of deceleration desired.

When the relationship between the speed of the controlled vehicle and the leading vehicle are such that the situation falls within the "Accelerate" region (defined as the region to the right of the acceleration speed curve $S_A$ as shown in FIG. 8), then microprocessor 242 generates a signal to cruise control module 270 resetting the speed reference point to a higher value corresponding to the degree of acceleration desired.

With reference to FIG. 5a, the methodology for implementing the criteria as set forth in FIGS. 8 and 9 and as followed by ADB microprocessor 242 are shown therein. The process is reiterated for each frame of video camera 20.

For each frame, the instantaneous closing rate CR is calculated as described above with regard to FIG. 5. In step 500, it is determined whether the calculated CR is greater than zero.

If CR is greater than zero, it is necessary to determine whether maximum braking is required. In step 501, the critical following distance $FD_C$ is calculated.

Preferably, $FD_C$ is calculated as:

$$FD_C = c(CR)^2 + e;$$

where c and e are adjustable, preferably preprogrammed parameters which may be chosen during the design/test phase of development to achieve the desired response curve in light of driving requirements, c being the parabola shaping constant, and e being a safety zone behind the leading auto. If the current following distance $FD_2$ is less than $FD_C$, then maximum braking is necessitated and step 503 is executed.

If the closing rate is positive but the current following distance is greater than the critical following distance $FD_C$, then step 504 is executed wherein acceleration boundary speed $S_A$ and braking boundary speed $S_B$ are calculated. Preferably:

$$S_A = a(FD_2 - d);$$

where a and d are adjustable, preferably preprogrammed parameters which may be chosen during the design/test phase of development to achieve the desired response curve in light of driving requirements, a being the slope of the acceleration boundary, and d being a safety zone behind the leading auto. Preferably:

$$S_B = b(FD_2 - d);$$

where b and d are adjustable, preferably preprogrammed parameters which may be chosen during the design/test phase of development to achieve the desired response curve in light of driving requirements, b being the slope of the braking boundary, and d being a safety zone behind the leading auto. For the remainder of the process, it is only necessary to compare the actual speed S of the controlled vehicle 12 to the calculated values $S_A$ and $S_B$.

In step 505, an initial determination is made as to whether the actual speed S exceeds the speed limit as input via speed limit input means 260. Speed limit input means 260 may be, for example, a keyboard. If the speed S exceeds the speed limit, then the vehicle is decelerated in step 506.

If the actual speed of the vehicle is within the speed limit, then the determination is made in step 507 as to whether a passing vehicle is detected, that is, whether there suddenly exist sensing pixels 48 in the middle of the field of view representing a vehicle or portion of a vehicle which did not enter from the top of the field of view. Pixels just interior of the left and/or the right side lane stripes are monitored. Thus, steering control subsystem 100 searches for encroaching autos just outside the lane stripe and ADB subsystem 200 searches for passing autos in the lane. If a passing vehicle is detected, then the next frame is evaluated to determine the following distance FD to the newly adopted leading vehicle.

If no such passing vehicle is detected, then it is determined in step 508 whether the actual speed S of the controlled vehicle is less than acceleration boundary speed $S_A$. If so, then the controlled vehicle is travelling at a speed less than that desired and required by the environment. Accordingly, step 509 is executed wherein microprocessor 242 resets the speed of the vehicle by generating an acceleration signal to cruise control module 270.

If, in step 510, microprocessor 242 determines that vehicle speed S is between or equal to acceleration speed $S_A$ and braking speed $S_B$ for the actual following distance $FD_2$, then it next determines in step 511 whether the calculated closing rate is zero or positive. If the closing rate is zero or positive, then deceleration is truly necessitated and, in step 512, microprocessor 242 generates a signal to the cruise control module to decelerate the vehicle. However, if the closing rate is negative, then deceleration may not in fact be needed because, while the following distance is too close for the given speed, the leading vehicle is pulling away from the controlled vehicle. In such case, it is unnecessary to take action.

If the actual speed S of the vehicle exceeds the calculated braking speed $S_B$, then microprocessor 242 then determines whether the closing rate is zero or positive. If the closing rate is non-negative, then the proportional brake rate PBR is calculated in step 514 as the difference between the actual speed S and the calculated braking speed $S_B$. Thereafter, in step 515, microprocessor 242 generates a braking signal to brake actuator 280 having a strength which is proportional to the degree of braking needed. If the closing rate is negative, then no action is taken as, again, this indicates that the leading vehicle is pulling away. Notably, the PBR will be readjusted for each frame inputted (i.e., 30 times per second).

With reference to FIG. 7, brake actuator 280 of ADB subsystem 200 is shown therein mounted on a controlled vehicle. Flared, rigid tube 282 is positioned in an aperture formed through fire wall 276 of the vehicle. Flexible cable 284 is mounted by attachment nut 284a to the back of vehicle brake pedal 274 and continues through tube 282 to servo actuator 286. Servo actuator 286 is controlled by control signals from ADB microprocessor 242 via input lead 287. Servo actuator 286 is operative to retract and release flexible cable 284 to accomplish the braking function of vehicle control system 10. When servo actuator 286 releases a given length of flexible cable 284, the spring biased vehicle brake pedal 274 pulls flexible cable 284 straight. If there is any residual slack in flexible cable 284, spring 288 pulls the cable tight.

Brake actuator 280 as described above provides several significant benefits. Brake actuator 280 is easily installable on the vehicle, requiring only a relatively small hole in the fire wall and a simple attachment to the back of the vehicle's brake pedal. Brake actuator 280 may be easily overridden by the driver in the case that emergency braking is required in a situation not accounted for by vehicle control system 10. In such case, the driver need only apply the brake in conventional fashion; slack created in flexible cable 284 will be taken up on the engine side of the firewall by spring 288.

Servo actuator 286 may be, for example, a single action servo actuator such as a rack and pinion mechanism driven by a DC motor. Suitable servo actuators are available from G. H. Bettis of Waller, Tex.

While a preferred embodiment of the present invention has been described, it will be appreciated by those of skill in the art that certain modifications may be made without departing from the scope of the present invention. All such modifications are intended to come within the scope of the claims which follow.

What is claimed is:

1. A driver emulative vehicle control system for use with a vehicle, the vehicle to be driven in a lane defined by a first lane stripe and a second lane stripe and of the type having a steering shaft, a throttle control, a brake, and a turn signal, said vehicle control system comprising:
  a) a video camera which transduces light variations in a prescribed field in front of the vehicle into frames of electrical variations, each of said frames comprising a plurality of scan lines, said scan lines each comprising a plurality of pixels;
  b) a digitizer electrically connected with said video camera and operative to digitize said frames of electrical variations;
  c) a computer electrically connected with said digitizer, said computer operative to receive said digitized frames and having processing means, said processing means including:
    i) addressing means operative to create an image in a mapping memory such that each pixel of each frame is addressed by a scan line number and a pixel number;
    ii) steering control processing means operative to read said mapping memory, to determine for each frame the location of the first lane stripe with respect to the vehicle, and to generate steering control signals corresponding to the determined locations of the first lane stripe; and
    iii) speed control processing means operative to read said mapping memory, to determine for each frame the presence and location with respect to the vehicle of a leading vehicle in the lane, and to generate speed control signals corresponding to the determined locations of the leading vehicle;
  d) steering control means operative to receive said steering control signals and to control the steering shaft of the vehicle in accordance with said steering control signal; and
  e) speed control means operative to receive said speed control signals and to control at least one of the throttle control and the brake of the vehicle.

2. The vehicle control system of claim 1 wherein said steering control means comprises a motor operative in response to said steering control signals to turn the steering shaft of the vehicle.

3. The vehicle control system of claim 2 wherein said steering control means further includes an electromagnetic clutch fixedly mounted on the steering shaft, a driven gear rotatably mounted on the steering shaft, and a drive gear mounted for rotation by said motor and intermeshed with said driven gear, wherein said electromagnetic clutch is selectively energizeable and de-energizeable, and wherein, when said electromagnetic clutch is energized, said electromagnetic clutch engages said driven gear and, when said electromagnetic clutch is de-energized, said electromagnetic clutch disengages from said driven gear.

4. The vehicle control system of claim 3 wherein said electromagnetic clutch is de-energized by actuation of the vehicle turn signal.

5. The vehicle control system of claim 1 wherein said speed control means includes brake control means operative to control the actuation of the vehicle's brake.

6. The vehicle control system of claim 5 wherein said brake control means includes a servo actuator interconnected with a brake pedal and operative to control the position of the brake pedal.

7. The vehicle control system of claim 5 wherein said speed control means further includes means for controlling the throttle control of the vehicle.

8. The vehicle control system of claim 1 wherein said speed control means includes means for controlling the throttle control of the vehicle.

9. The vehicle control system of claim 1 wherein said steering control processing means is operative to determine the location of the first lane stripe with respect to the vehicle by first determining whether a first sensing pixel is present on a first reference scan line and, if said first sensing pixel is present, determining the distance between said first sensing pixel and a first reference pixel, and, if no first sensing pixel is present on said first reference scan line, locating a second sensing pixel on a second reference scan line and determining the distance between said second sensing pixel and a second reference pixel.

10. The vehicle control system of claim 1 wherein said speed control processing means is operative to determine a following distance for each frame corresponding to the distance between the vehicle and the leading vehicle, and is further operative to determine a closing rate between the vehicle and the leading vehicle as a function of the difference between the determined following distances of consecutive frames.

11. The vehicle control system of claim 10 wherein the speed control processing means is operative to generate a braking signal proportional to a prescribed value, said prescribed value corresponding to the instantaneous following distance and the instantaneous closing rate of the vehicle.

12. The vehicle control system of claim 1 wherein said speed control processing means includes means for determining the speed of the vehicle and is operative to determine a following distance corresponding to the distance between the vehicle and the leading vehicle, said speed control processing means operative to generate a brake signal when a prescribed relationship between the speed of the vehicle and the following distance is within a prescribed braking region, said speed control processing means operative to generate a decelerate signal when said prescribed relationship is within a prescribed decelerating region, said speed control processing means operative to generate an accelerate signal when said prescribed relationship is within a prescribed accelerating region.

13. A method for automatically controlling the steering of a vehicle in a lane, said method comprising:
   a) inputting a video image comprising a plurality of scan lines, each of the scan lines comprising a plurality of pixels;
   b) digitizing the video image;
   c) counting and addressing each of the scan lines and pixels of the video image into a mapping memory;
   d) determining whether a first reference scan line is intersecting a solid lane stripe;
   e) if the first reference scan line is not intersecting a lane stripe, determining the scan line representing the portion of the video image closest to the vehicle which does intersect a solid lane stripe and identifying a first sensing pixel;
   f) if the reference scan line is intersecting a solid lane stripe, identifying the first sensing pixel on the reference scan line;
   g) determining the number of pixels between the first sensing pixel and a center pixel;
   h) calculating a deviation from the center of the lane as a function of the number of pixels between the first sensing pixel and the center pixel; and
   i) generating a deviation signal corresponding to the calculated deviation.

14. A method for automatically controlling the acceleration, deceleration, and braking of a vehicle, said method comprising the steps of:
   a) inputting a video image comprising a plurality of scan lines;
   b) digitizing the video image;
   c) addressing the scan lines of the video image into a mapping memory;
   d) determining whether a leading vehicle is present in the video image;
   e) identifying a nearest scan line which intersects the leading vehicle;
   f) determining the actual following distance between the vehicle and the leading vehicle corresponding to the number of the nearest scan line which detects the leading vehicle by reference to a look-up file;
   g) if the actual following distance exceeds a prescribed maximum following distance, setting the actual following distance equal to the prescribed maximum following distance;
   h) calculating an instantaneous closing rate as equal to the difference between a previous following distance and a current following distance divided by the time between respective video images;
   i) determining an appropriate action as a function of the calculated closing rate; and
   j) generating a control signal corresponding to the determined appropriate action to at least one of a vehicle cruise control module and a brake actuator.

15. The method of claim 14 wherein said step of determining an appropriate action as a function of the calculated closing rate further includes determining the appropriate action as a function of a vehicle speed and a speed limit.

16. A vehicle control system for use with a vehicle having a steering mechanism and a brake, comprising:
   a) video means for inputting frames of a field of view;
   b) a computer for receiving and processing said frames, said computer including:
      i) addressing means for addressing said frames;
      ii) steering control processing means for generating steering control signals corresponding to the location of the vehicle in a lane; and
      iii) speed control processing means for generating speed control signals corresponding to the location of a leading vehicle;
   c) steering control means for controlling the steering mechanism of the vehicle in accordance with the steering control signals; and
   d) speed control means for controlling the speed and brake of the vehicle in accordance with the speed control signals.

17. A driver emulative vehicle control system for use with a vehicle, the vehicle to be driven in a lane defined by a first lane stripe and a second lane stripe and of the type having a steering shaft and a turn signal, said vehicle control system comprising:
   a) a video camera which transduces light variations in a prescribed field in front of the vehicle into frames of electrical variations, each of said frames comprising a plurality of scan lines, said scan lines each comprising a plurality of pixels;
   b) a digitizer electrically connected with said video camera and operative to digitize said frames of electrical variations;
   c) a computer electrically connected with said digitizer, said computer operative to receive said digitized frames and having processing means, said processing means including:
      i) addressing means operative to create an image in a mapping memory such that each pixel of each frame is addressed by a scan line number and a pixel number; and
      ii) steering control processing means operative to read said mapping memory, to determine for each frame the location of the first lane stripe with respect to the vehicle, and to generate steering control signals corresponding to the determined locations of the first lane stripe; and
   d) steering control means operative to receive said steering control signals and to control the steering shaft of the vehicle in accordance with said steering control signal.

18. The vehicle control system of claim 17 wherein said steering control means comprises a motor operative in response to said steering control signals to turn the steering shaft of the vehicle.

19. The vehicle control system of claim 18 wherein said steering control means further includes an electromagnetic clutch fixedly mounted on the steering shaft, a driven gear rotatably mounted on the steering shaft, and a drive gear mounted for rotation by said motor and intermeshed with said driven gear, wherein said electromagnetic clutch is selectively energizeable and de-energizeable, and wherein, when said electromagnetic clutch is energized, said electromagnetic clutch engages said driven gear and, when said electromagnetic clutch is de-energized, said electromagnetic clutch disengages from said driven gear.

20. The vehicle control system of claim 19 wherein said electromagnetic clutch is de-energized by actuation of the vehicle turn signal.

21. The vehicle control system of claim 17 wherein said steering control processing means is operative to determine the location of the first lane stripe with respect to the vehicle by first determining whether a first sensing pixel is present on a first reference scan line and, if said first sensing pixel is present, determining the distance between said first sensing pixel and a first reference pixel, and, if no first sensing pixel is present on said first reference scan line, locating a second sensing pixel on a second reference scan line and determining the distance between said second sensing pixel and a second reference pixel.

22. A driver emulative vehicle control system for use with a vehicle, the vehicle to be driven in a lane and of the type having a throttle control and a brake, said vehicle control system comprising:
   a) a video camera which transduces light variations in a prescribed field in front of the vehicle into frames of electrical variations, each of said frames comprising a plurality of scan lines;
   b) a digitizer electrically connected with said video camera and operative to digitize said frames of electrical variations;
   c) a computer electrically connected with said digitizer, said computer operative to receive said digitized frames and having processing means, said processing means including:
      i) addressing means operative to create an image in a mapping memory such that each scan line of each frame is addressed; and
      ii) speed control processing means operative to read said mapping memory, to determine for each frame the presence and location with respect to the vehicle of a leading vehicle in the lane, and to generate speed control signals corresponding to the determined locations of the leading vehicle; and
   d) speed control means operative to receive said speed control signals and to control at least one of the throttle control and the brake of the vehicle.

23. The vehicle control system of claim 22 wherein said speed control means includes brake control means operative to control the actuation of the vehicle's brake.

24. The vehicle control system of claim 23 wherein said brake control means includes a servo actuator interconnected with a brake pedal and operative to control the position of the brake pedal.

25. The vehicle control system of claim 23 wherein said speed control means further includes means for controlling the throttle control of the vehicle.

26. The vehicle control system of claim 22 wherein said speed control means includes means for controlling the throttle control of the vehicle.

27. The vehicle control system of claim 22 wherein said speed control processing means is operative to determine a following distance for each frame corresponding to the distance between the vehicle and the leading vehicle, and is further operative to determine a closing rate between the vehicle and the leading vehicle as a function of the difference between the determined following distances of consecutive frames.

28. The vehicle control system of claim 27 wherein the speed control processing means is operative to generate a braking signal proportional to a prescribed value, said prescribed value corresponding to the instantaneous following distance and the instantaneous closing rate of the vehicle.

29. The vehicle control system of claim 22 wherein said speed control processing means includes means for determining the speed of the vehicle and is operative to determine a following distance corresponding to the distance between the vehicle and the leading vehicle, said speed control processing means operative to generate a brake signal when a prescribed relationship between the speed of the vehicle and the following distance is within a prescribed braking region, said speed control processing means operative to generate a decelerate signal when said prescribed relationship is within a prescribed decelerating region, said speed control processing means operative to generate an accelerate signal when said prescribed relationship is within a prescribed accelerating region.

* * * * *